(12) United States Patent
Banta et al.

(10) Patent No.: US 9,723,223 B1
(45) Date of Patent: Aug. 1, 2017

(54) APPARATUS AND METHOD FOR PANORAMIC VIDEO HOSTING WITH DIRECTIONAL AUDIO

(71) Applicant: StealthHD LLC, Seattle, WA (US)

(72) Inventors: Bill Banta, Lafayette, CA (US); Paul Alioshin, Palo Alto, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 563 days.

(21) Appl. No.: 14/040,435

(22) Filed: Sep. 27, 2013

Related U.S. Application Data

(60) Provisional application No. 61/707,746, filed on Sep. 28, 2012.

(51) Int. Cl.
*H04N 9/47* (2006.01)
*H04N 5/265* (2006.01)

(52) U.S. Cl.
CPC .................................. *H04N 5/265* (2013.01)

(58) Field of Classification Search
CPC ... H04N 5/3415; H04N 5/23238; G03B 37/00
USPC .......................................................... 348/38
See application file for complete search history.

(56) References Cited

U.S. PATENT DOCUMENTS

| | | | |
|---|---|---|---|
| 5,319,465 A | 6/1994 | Squyres et al. | |
| 5,748,199 A | 5/1998 | Palm | |
| 6,043,837 A | 3/2000 | Driscoll, Jr. et al. | |
| 6,133,944 A | 10/2000 | Braun et al. | |
| 6,192,393 B1 | 2/2001 | Tarantino et al. | |
| 6,611,241 B1 | 8/2003 | Firester et al. | |
| 6,788,333 B1 * | 9/2004 | Uyttendaele | G06T 7/0018 348/36 |
| 7,324,664 B1 | 1/2008 | Jouppi et al. | |
| 8,334,905 B2 | 12/2012 | Bhan | |
| 8,406,562 B2 | 3/2013 | Bassi et al. | |
| 8,605,783 B2 | 12/2013 | El-Saban et al. | |
| 8,687,070 B2 | 4/2014 | Chen et al. | |
| 2002/0021353 A1 | 2/2002 | DeNies | |
| 2002/0049979 A1 | 4/2002 | White et al. | |
| 2002/0067412 A1 | 6/2002 | Kawai et al. | |
| 2003/0030678 A1 | 2/2003 | Rosenholtz et al. | |
| 2003/0197785 A1 | 10/2003 | White et al. | |
| 2004/0030527 A1 | 2/2004 | Rankin | |
| 2004/0032495 A1 | 2/2004 | Ortiz | |
| 2004/0264919 A1 | 12/2004 | Taylor et al. | |
| 2005/0002535 A1 * | 1/2005 | Liu | H04H 60/04 381/58 |
| 2005/0280701 A1 * | 12/2005 | Wardell | H04M 3/568 348/14.08 |
| 2006/0204142 A1 | 9/2006 | West et al. | |
| 2007/0035612 A1 * | 2/2007 | Korneluk | G08B 13/19671 348/14.01 |

(Continued)

*Primary Examiner* — Tung Vo
*Assistant Examiner* — Zaihan Jiang
(74) *Attorney, Agent, or Firm* — K&L Gates LLP

(57) ABSTRACT

A server includes an input node to receive video streams forming a panoramic video. The server also receives audio tracks corresponding to the video streams. A module forms an audio track based upon a combination of at least two of the audio tracks and directional viewing data. The audio track may be a stereo, mixed or surround sound audio track with volume modulation based upon the directional viewing data. An output node sends the audio track to a client device.

17 Claims, 3 Drawing Sheets

(56) References Cited

U.S. PATENT DOCUMENTS

| | | |
|---|---|---|
| 2009/0284601 A1 | 11/2009 | Eledath et al. |
| 2010/0034425 A1 | 2/2010 | Lin et al. |
| 2010/0050221 A1 | 2/2010 | McCutchen et al. |
| 2010/0150458 A1 | 6/2010 | Angell et al. |
| 2010/0299630 A1 | 11/2010 | McCutchen et al. |
| 2011/0214072 A1 | 9/2011 | Lindemann et al. |
| 2012/0057852 A1 | 3/2012 | Devleeschouwer et al. |
| 2012/0162362 A1* | 6/2012 | Garden .............. H04N 13/0468 348/42 |
| 2012/0210252 A1* | 8/2012 | Fedoseyeva ..... G06Q 10/06398 715/753 |
| 2013/0070047 A1 | 3/2013 | DiGiovanni et al. |
| 2013/0141523 A1 | 6/2013 | Banta et al. |
| 2013/0141526 A1 | 6/2013 | Banta et al. |
| 2013/0328910 A1 | 12/2013 | Jones et al. |

\* cited by examiner

APPARATUS AND METHOD FOR PANORAMIC VIDEO HOSTING WITH DIRECTIONAL AUDIO

CROSS-REFERENCE TO RELATED APPLICATION

This application claims priority to U.S. Provisional Patent Application 61/707,746, filed Sep. 28, 2012, the contents of which are incorporated herein by reference. This application is related to U.S. Ser. No. 13/691,654, filed Nov. 30, 2012, which claims priority to U.S. Provisional Patent Application 61/566,269, filed Dec. 2, 2011, the contents of which are incorporated herein by reference.

FIELD OF THE INVENTION

This invention relates generally to panoramic video signal processing. More particularly, this invention relates to techniques for panoramic video hosting with directional audio supplied to networked client devices.

BACKGROUND OF THE INVENTION

Panoramic video images may be acquired using a group of cameras. The panoramic video images may be uploaded to a server where the images are made available to networked client devices. Consequently, the networked client devices may follow an event that is being panoramically videoed and request perspectives of interest. Such processing generates large volumes of video data that must be processed and transmitted in an efficient manner. Each video stream may be accompanied by an audio track. Techniques are required for selecting appropriate audio for any given streamed video.

SUMMARY OF THE INVENTION

A server includes an input node to receive video streams forming a panoramic video. The server also receives audio tracks corresponding to the video streams. A module forms an audio track based upon a combination of at least two of the audio tracks and directional viewing data. The audio track may be a stereo, mixed or surround sound audio track with volume modulation based upon the directional viewing data. An output node sends the audio track to a client device.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
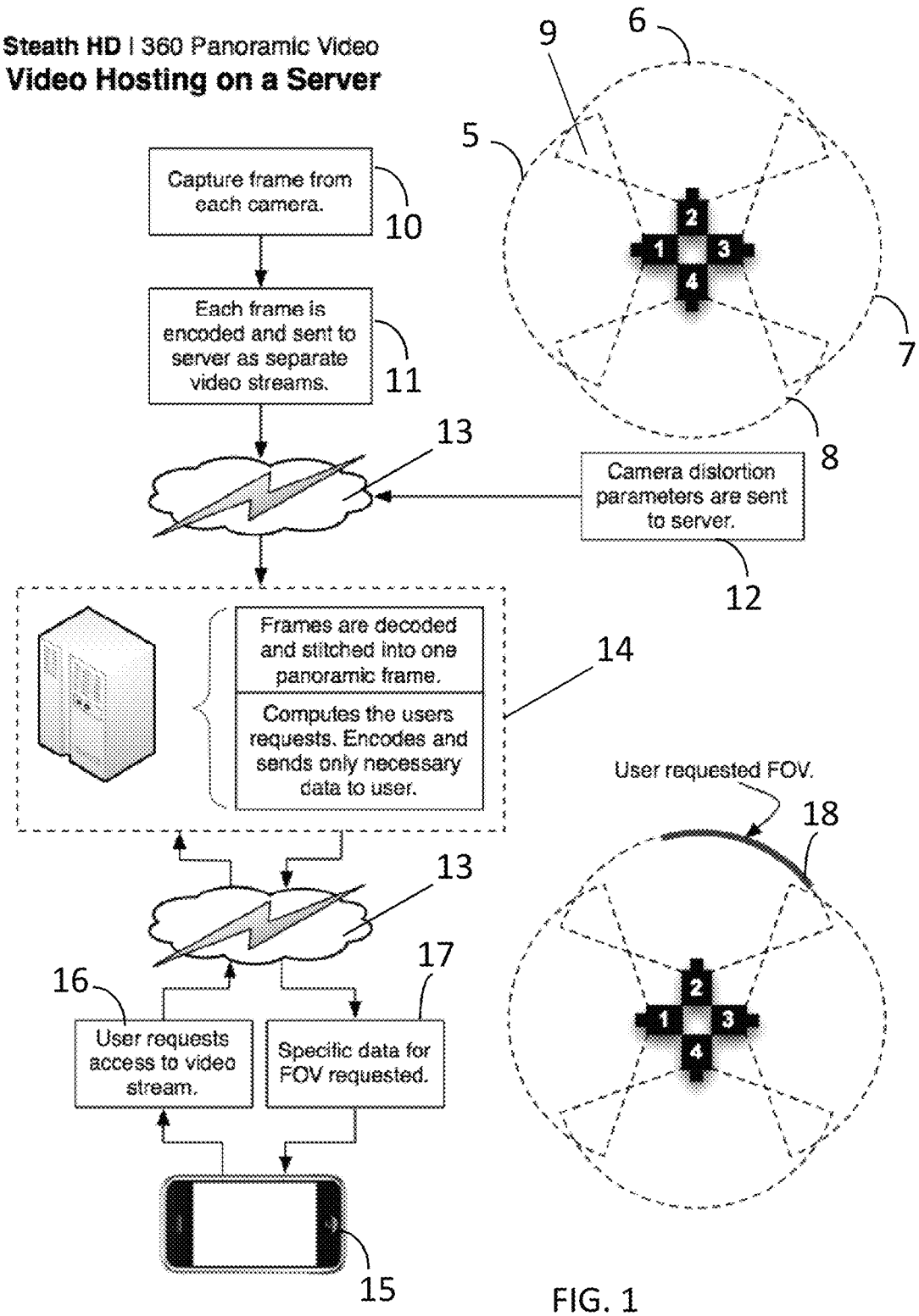
FIG. 1 illustrates a system configured in accordance with an embodiment of the invention.

FIG. 1 illustrates a system configured in accordance with an embodiment of the invention. In this example, the system includes four cameras 1, 2, 3 and 4. Each camera has a field of view, respectively 5, 6, 7 and 8, which forms a panoramic field of view. Field of view overlap regions 9 may exist.

Frames are captured from each camera 10 and then each frame is encoded and is sent to a server as a separate video stream 11. Each frame may have an associated audio track. Thus, each camera generates a separate audio track.

Camera distortion parameters may also be sent 12, as described in the commonly owned co-pending patent application entitled "Apparatus and Method for Video Image Stitching Utilizing Alignment and Calibration Parameters", Ser. No. 13/691,632, filed Nov. 30, 2012, the contents of which are incorporated herein by reference.

The cameras 1, 2, 3, 4 may include a wired or wireless link to network 13. Server 14 is also connected to network 13. An input node of the server 14 receives the video signals. The server 14 decodes frames and stitches them into a panoramic frame. The server 14 receives user requests and encodes necessary data to service each request. In one embodiment, the server includes a module with executable instructions to form a suggested field of view in the panoramic video. An output node of the server sends video signals to a client device.

The user requests are from a client device 15, such as Smartphone, Tablet, personal computer, wearable computation device and the like. A user requests access to a video stream 16. The server 14 services the request and delivers the requested video through the network 13 as specific data for a requested field of view 17, which may then be displayed on the client device 15. FIG. 1 illustrates a requested field of view 18, which is a segment of the panoramic video image. The field of view 18 is a projection of video from the real world in a virtual space. By giving the user a virtual field of view within the projection space, users have the opportunity to navigate a real world environment within the virtual world. This allows users to virtually interact with real world content remotely real time, or at a later time after the video data has been captured. With the completed video stream, users can return to a real world event after an event and use their virtual field of view to engage with the real world content in new ways, as if they were experiencing the event again real time and in person.

The invention allows for multiple image processing services to be conducted on server 14. For example, the server 14 may provide error detection and correction. Further, the sever 14 may map and learn user interactions with the video content to optimize data streams. The server 14 can also monitor available bandwidth available on the network 13. The server 14 can then stream only field of view 18 to the device 15, or it can stream additional data outside of the field of view 18 to enable smoother navigation of the video stream. When additional data outside the field of view is sent to the client device, but the entire panoramic (or wide angle) video stream is not streamed to the client device, this extra video data is referred to as the buffer.

In one embodiment, two input parameters are sent to the server. One parameter is the user's viewing location based upon the coordinate system of FIG. 2. The user location is defined as the center point 302 of the field of view 304. This input parameter is only sent to the server when it changes. Another parameter is the user's current field of view 304. This input parameter is only sent to the server when it changes.

In order to keep the video playing smoothly while the user moves, a small buffer 306 is added to the video frame. This gives the server time to respond to the change in location and update the video stream sent to the user accordingly without the user noticing disrupted video playback.

Figure 2:
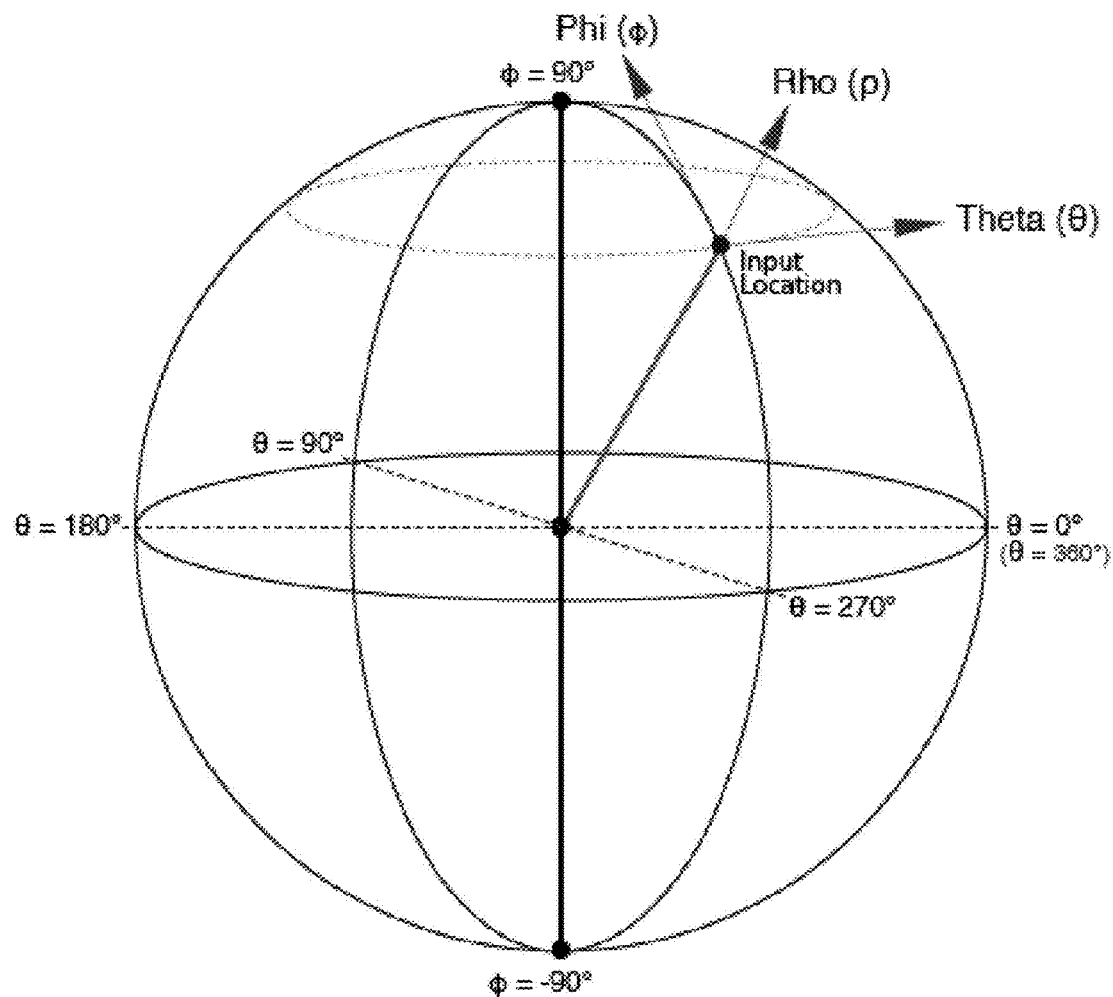
FIG. 2 illustrates a coordinate system that may be utilized in accordance with an embodiment of the invention.

The following parameters may be used to calculate the user's location with respect to the panoramic frame in the coordinate system of FIG. 2.
User Area=(1280 px, 700 px)
panoHeight (total height of panoramic video stream)=720 px
panoWidth (total width of panoramic video stream)=4000 px
p (radius)=340 px
φ=0°
θ=92°

$$x = \left(\frac{panoWidth}{360°}\right) * \theta$$
$$= \left(\frac{4000\ px}{360°}\right) * 92°$$
$$= 1022\ px$$

$$y = (panoHeight/2) - p * \sin\left(\phi * \frac{\pi}{180°}\right) * (panoHeight/180°/2)$$
$$= (720\ px/2) - 340\ px * \sin\left(0° * \frac{\pi}{180°}\right) * (720\ px/180°/2)$$
$$= 360\ px - 0\ px = 360\ px$$

An aspect of the invention is a new method for improving video that includes additional data that allows for more intuitive navigation and use of panoramic video. When paired with visual video data, certain auxiliary data such as audio can be tied to coordinates in the video. This allows multiple audio tracks to be included in the file format with the final audio delivered to the user having a reduced (e.g., mono or stereo pair) signal, processed given the multiple audio tracks, their known directional information and the direction of view of the user.

Other augmented reality (e.g., video, audio, haptic) features or embedded links can also be efficiently placed throughout the video using a global (360 degrees in x and y axes) coordinate system plus the individual user's direction of view.

In at least some preferred implementations, it is possible to use current digital audio standards for transport of multiple audio signals as well as processing at either or both of nodes (camera/user, processing/cloud). These standards could be Dolby Pro Logix® IIx, DTS 5.1, or some other method.

Standard video streams provide one audio track to be played simultaneously and in synchronicity with the video. While this audio track may have different channels that enable more audio data to be played, for example in a theatre with surround sound capability, there is only a single audio track that is played with the video. For example, at a specific time during the video, there is only one arrangement of audio data that is played at that moment in time. Multiple audio channels may allow for stereo audio or surround sound, but the separate channels do not provide a fundamentally different sound track when played with the video. Every time a user watches a specific sequence of video, they hear the same audio track that is played in conjunction with the video shown on the screen.

The audio track that is played with the 360° or wide angle video varies depending upon the direction where the user is looking in the panoramic video stream. This direction of view may be designated DoV.

An embodiment of the invention adds more audio data to the video file and pairs this audio data with specific coordinates or perspectives of the audio data in relation to the video data. This enables a variety of tracks to be played in parallel with the video data. Multiple audio tracks can also be played simultaneously. Based on where the user has navigated the area of interest (or DoV), a blend of audio tracks may be played that best represents the users chosen perspective of the video data.

This method also allows for additional data to be added to the video file. This data can be tied to global x/y coordinates within the video stream, enabling features or embedded links to be located at specific physical points within the video. This allows embedded links, computer vision tagging, visual and/or audible queues or information in addition to other augmented reality features including audio, video and haptic contact to be used in conjunction with panoramic video.

Metadata or a new file format incorporates additional data specific to the area of the video that is being viewed by the user. This method may use planar (for single-camera wide angle), cylindrical, spherical (or global) coordinate systems as the reference for where the user focused within the entire video stream.

One implementation is to have the video divided into a grid pattern using 360 degrees vertically and horizontally to create a spherical (or global) coordinate grid in space. A center-line is created in both the horizontal and vertical and the size of the grid pattern can be divided into segments of the user's choice. By way of example, this disclosure describes a spherical viewing surface with 360 degrees of freedom in both the horizontal and vertical.

The video is overlaid onto this grid so that software can track where the viewer is looking at any given moment using the coordinate system. Using coordinates, software tracks how the user navigates the video, for example, do they move quickly or slowly, are there tendencies to move left/right or up/down, how quickly does the user settle on an area of interest and stay there, etc.

Regions/directions of interest based upon image processing, audio processing, information sourced from crowd data or other sources as described above or artificially decided may be enhanced audibly by increasing the "volume" of items of interest (e.g., race car or a floating advertisement) as well as giving audible and visual cues to look toward this area of interest. This is an example where more audio tracks may be used than simply the minimum channels corresponding to the video in the view.

Figure 3:
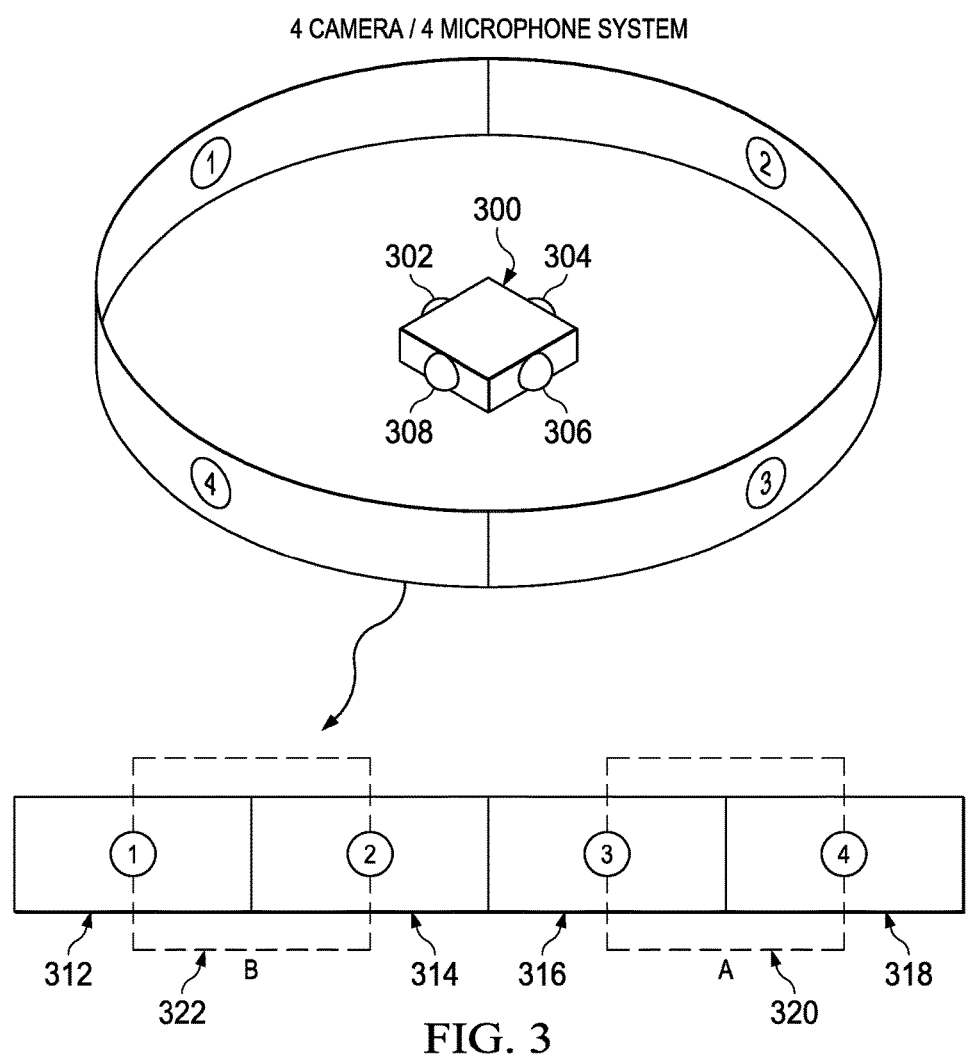
FIG. 3 illustrates audio selection for a four camera system utilized in accordance with an embodiment of the invention.

FIG. 3 illustrates a four camera/microphone system 300. The system 300 may have microphones that are separate from cameras or microphones that are integrated with cameras. Microphones 302, 304, 306 and 308 generate corresponding individual audio tracks 312, 314, 316 and 318. An A audio track 320 and a B audio track 322 are created from the four microphones capturing audio along with each camera and having an audio field of "view" similar to the video FoV.

In the case of A audio track 320, the Direction of View is exactly between microphone 306 and microphone 308. Therefore, the audio track may be a simple average of the two frames. For stereo, the audio track 316 may be used as the left channel and the audio track 318 may be used for the right channel.

In the case of B audio track 322, the viewer is looking to the right of the camera 1-camera 2 boundary. The audio channel here may be a normalized, weighted average of the two channels. For example, $$A = \frac{1}{2}\left(\frac{1}{7}m_1 + \frac{6}{7}m_2\right)$$

Or more generally, $$A = \frac{1}{N}\sum f\{m_i, DoV\}$$

Using the data from the video allows third parties to track where users are looking in the video and how they are navigating the video. This opens up opportunities in the advertising industry. For example, new advertising pricing structures can be created based on the actual amount of screen time that an advertisement gets while a user is watching a video.

Advertisers can learn how users navigate video to more effectively place advertisements or brand messages in the videos so that they receive maximum visibility or make the strongest brand impression on the user.

For video streams that may have multiple tracks of stereo audio, separate tracks can be assigned to specific fields of view. As the user moves from one perspective to the next, the audio data changes. For example, if a user is listening to stereo audio and is facing forward, one set of sounds (Sound A) is specific to the left ear, and one set of sounds (Sound B) is specific to the right ear. If the user rotates his perspective 180 degrees, the stereo audio signals switch to better match the user's new perspective. Now facing the opposite direction, Sound A is specific to the right ear, while Sound B is specific to the left ear.

As the user navigates the panoramic video stream and does not settle in a direction that has a single overwhelming audio track, the coordinates of the viewer's exact position can be used to effectively blend the audio tracks. Blending audio tracks when there are multiple audio signals for that perspective provides the best representative sound signal based on the user's selected field of view.

Directional audio, when paired with stereo audio used by operators, allows users to "hear" activity to the left or right, and allows users to instinctually know where to navigate the field of view to the area of interest. Audio clues can serve as an indicator for activities outside of the operator's field of view. Directional audio gives users the ability to monitor activities outside of the visible field of view by listening for audio signals that serve as a cue to change the operator's field of view.

The disclosed techniques are also applicable to wide field of view images (i.e., not full 360° panoramic). The server may also receive a different number of audio streams that do not directly correlate with the number of cameras.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A server, programmed to:
receive first video data comprising a first frame captured by a first camera;
receive second video data comprising a second frame captured by a second camera;
receive a first audio track including audio data captured by a first microphone sensitive to sound received from a first microphone direction;
receive a second audio track including audio data captured by a second microphone sensitive to sound received from a second microphone direction different than the first microphone direction;
generate a first panoramic frame based at least in part on the first frame and the second frame;
receive first view direction data describing a first view direction offset from the first microphone direction and offset from the second microphone direction;
form a first stereo audio track based at least in part upon the first view direction, wherein the first stereo audio track comprises:
a first left channel track comprising a first weighted combination of the first audio track and the second audio track, wherein the first weighted combination is generated by applying a first weight to the first audio track based at least in part on the offset of the first view direction from the first microphone direction and applying a second weight to the second audio track based at least in part on the offset of the first view direction from the second microphone direction; and
a first right channel track comprising a second weighted combination of the first audio track and the second audio track, wherein the second weighted combination is generated by applying a third weight to the first audio track based at least in part on the offset of the first view direction from the first microphone direction and applying a fourth weight to the second audio track based at least in part on the offset of the first view direction from the second microphone direction;

send the first stereo audio track to a client device;

receive second view direction data describing a second view direction different than the first view direction;

form a second stereo audio track based at least in part upon the second view direction, wherein the second stereo audio track comprises:
  a second left channel track comprising the second weighted combination of the first audio track and the second audio track; and
  a second right channel track comprising the first weighted combination of the first audio track and the second audio track; and send the second stereo audio track to the client device.

2. The server of claim 1 wherein the first stereo audio track is a surround sound audio track.

3. The server of claim 2 wherein the surround sound audio track is modulated based upon the first view direction.

4. The server of claim 1 wherein a volume of the first stereo audio track is modulated based upon an item of interest in a video file.

5. The server of claim 1 wherein the server is further programmed to send to the client device a portion of the first panoramic frame corresponding to a field of view of a user, and wherein the first stereo audio track is modulated to include an aural clue corresponding to an event of potential interest outside of the field of view of the user.

6. The server of claim 1 wherein the second view direction is offset from the first view direction by about one hundred and eighty degrees.

7. A computer-implemented method of generating a panoramic video, the method comprising:
  receiving, by a server, first video data comprising a first frame captured by a first camera;
  receiving, by the server, second video data comprising a second frame captured by a second camera;
  receiving, by the server, a first audio track including audio data captured by a first microphone sensitive to sound received from a first microphone direction;
  receiving, by the server, a second audio track including audio data captured by a second microphone sensitive to sound received from a second microphone direction different than the first microphone direction;
  generating, by the server, a first panoramic frame based at least in part on the first frame and the second frame;
  receiving, by the server, first view direction data describing a first view direction offset from the first microphone direction and offset from the second microphone direction;
  forming, by the server, a first stereo audio track based at least in part upon the first view direction, wherein the first stereo audio track comprises:
    a first left channel track comprising a first weighted combination of the first audio track and the second audio track, wherein the first weighted combination is generated by applying a first weight to the first audio track based at least in part on the offset of the first view direction from the first microphone direction and applying a second weight to the second audio track based at least in part on the offset of the first view direction from the second microphone direction; and
    a first right channel track comprising a second weighted combination of the first audio track and the second audio track, wherein the second weighted combination is generated by applying a third weight to the first audio track based at least in part on the offset of the first view direction from the first microphone direction and applying a fourth weight to the second audio track based at least in part on the offset of the first view direction from the second microphone direction;

sending, by the server, the first stereo audio track to a client device;

receiving, by the server, second view direction data describing a second view direction different than the first view direction;

forming, by the server, a second stereo audio track based at least in part on the second view direction, wherein the second stereo audio track comprises:
  a second left channel track comprising the second weighted combination of the first audio track and the second audio track; and
  a second right channel track comprising the first weighted combination of the first audio track and the second audio track; and sending, by the server, the second stereo audio track to the client device.

8. The method of claim 7 wherein the second view direction is offset from the first view direction by about one hundred and eighty degrees.

9. The method of claim 7 wherein the first stereo audio track is a surround sound audio track.

10. The method of claim 9 wherein the surround sound audio track is modulated based upon the first view direction.

11. The method of claim 7 wherein a volume of the first stereo audio track is modulated based upon an item of interest in a video file.

12. The method of claim 7 wherein the server is further programmed to send to the client device a portion of the first panoramic frame corresponding to a field of view of a user, and wherein the first stereo audio track is modulated to include an aural clue corresponding to an event of potential interest outside of a field of view of the user.

13. A server comprising a non-transitory computer readable storage medium including computer code for performing a method comprising:
  receiving first video data comprising a first frame captured by a first camera;
  receiving second video data comprising a second frame captured by a second camera;
  receiving a first audio track including audio data captured by a first microphone sensitive to sound received from a first microphone direction;
  receiving a second audio track including audio data captured by a second microphone sensitive to sound received from a second microphone direction different than the first microphone direction;
  generating a first panoramic frame based at least in part on the first frame and the second frame;
  receiving first view direction data describing a first view direction offset from the first microphone direction by a first amount and offset from the second microphone direction by a second amount;
  forming a first stereo audio track based at least in part upon the first view direction, wherein the first stereo audio track comprises:
    a first left channel track comprising a first weighted combination of the first audio track and the second audio track, wherein the first weighted combination is generated by applying a first weight to the first audio track based at least in part on the first amount of offset of the first view direction from the first microphone direction and applying a second weight to the second audio track based at least in part on the second amount of offset of the first view direction from the second microphone direction; and a first right channel track comprising a second weighted combination of the first audio track and the second audio track, wherein the second weighted combination is generated by applying a third weight to the first audio track based at least in part on the first amount of offset of the first view direction from the first microphone direction and applying a fourth weight to the second audio track based at least in part on the second amount of offset of the first view direction from the second microphone direction;

sending the first stereo audio track to a client device;

receiving second view direction data describing a second view direction different than the first view direction, the second view direction being offset from the first microphone direction by a third amount and offset from the second microphone direction by a fourth amount;

forming a second stereo audio track based at least in part upon the second view direction, wherein the second stereo audio track comprises:

a second left channel track comprising the second weighted combination of the first audio track and the second audio track; and a second right channel track comprising the first weighted combination of the first audio track and the second audio track; and sending the second stereo audio track to the client device.

14. The server of claim 13, wherein the method further comprises sending to the client device a portion of the first panoramic frame corresponding to a field of view of a user, and wherein the first stereo audio track is modulated to include an aural clue corresponding to an event of potential interest outside of the field of view of the user.

15. The server of claim 13, wherein the second view direction is offset from the first view direction by about one hundred and eighty degrees.

16. The server of claim 13 wherein the first stereo audio track is a surround sound audio track.

17. The server of claim 16 wherein the surround sound audio track is modulated based upon the first view direction.

* * * * *